Aug. 15, 1933.  A. HUND  1,922,047
SPACE DISCHARGE TUBE AND MOUNTING THEREFOR
Filed Nov. 2, 1931
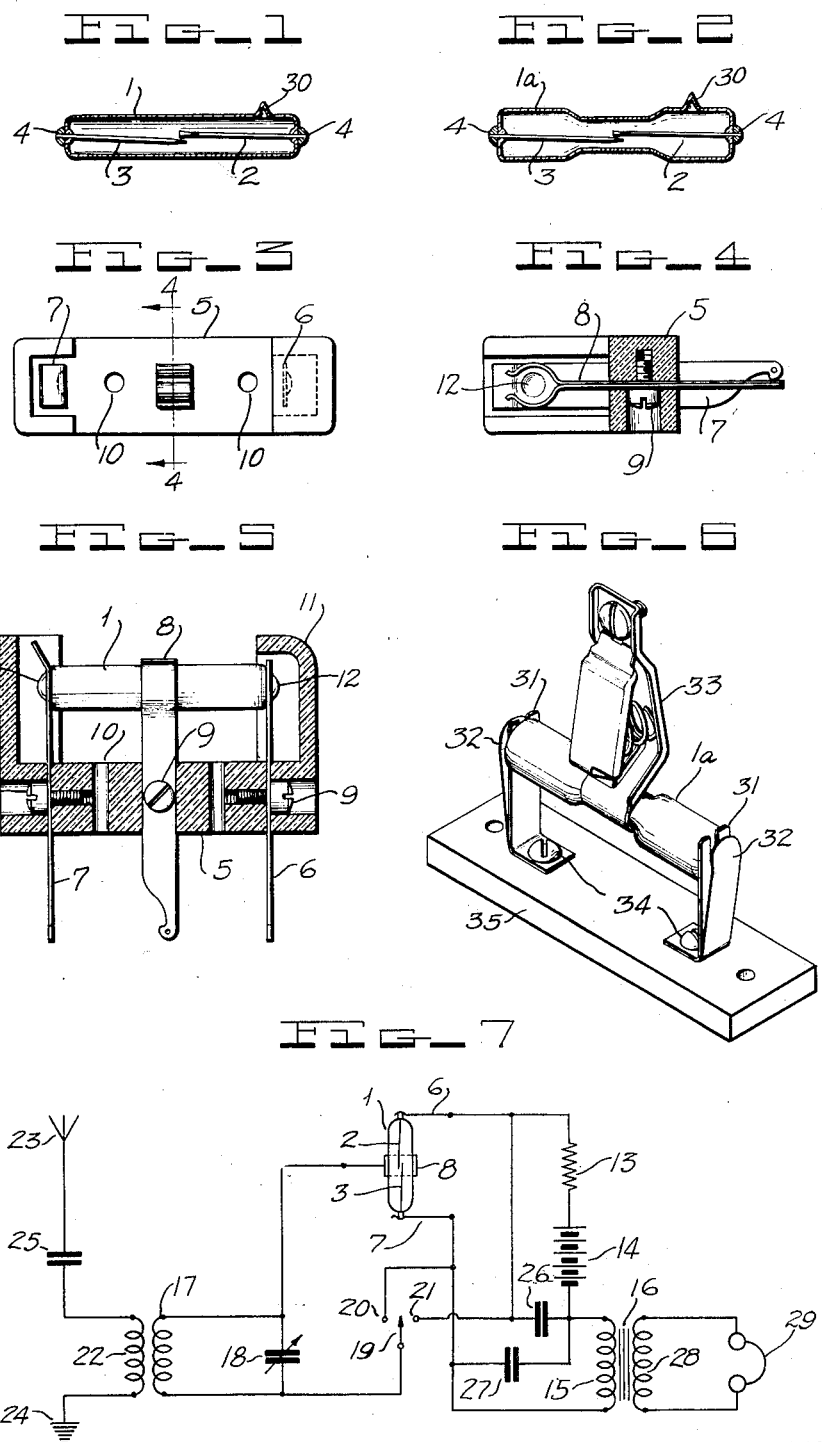
INVENTOR
August Hund
BY
ATTORNEY Patented Aug. 15, 1933

1,922,047

UNITED STATES PATENT OFFICE 1,922,047

SPACE DISCHARGE TUBE AND MOUNTING THEREFOR

August Hund, West Orange, N. J., assignor to Wired Radio, Inc., New York, N. Y., a Corporation of Delaware Application November 2, 1931. Serial No. 572,552

4 Claims. (Cl. 250—27.5)

This invention relates to radio frequency space discharge tubes and more particularly to certain details of construction of such tubes together with mountings therefor.

One of the objects of this invention is to provide a space discharge tube of extremely simple construction having an anode and a cathode and having a mounting which is adapted to supply a third electrode externally of the tube.

A further object is to effect modulation or demodulation of signaling energy by means of a gaseous discharge tube having an unheated cathode, an anode and an externally applied control electrode.

These and other useful objects are attained by a novel construction of the space discharge tube which is connected with a source of direct current and a resistance and by suitably mounting the tube so that a third electrode surrounding the glass portion may provide capacitative effects upon the internal electrodes of the tube whereby currents passing therethrough are either modulated or demodulated.

In the drawing which accompanies and forms a part of this specification and in which like reference characters designate corresponding parts throughout:

Fig. 1 is a view of one embodiment of my space discharge tube;

Fig. 2 is another embodiment of the same;

Fig. 3 is a front view of a suitable mounting for the tube;

Fig. 4 is a cross section along the line 4—4 of Fig. 3;

Fig. 5 is a sectional view of the mounting, the tube being assembled therewith;

Fig. 6 shows a modification of the tube mounting; and

Fig. 7 is a circuit diagram showing how the space discharge tube of my invention may be utilized as a detector.

In my copending application, Serial No. 568,906, filed October 15, 1931, for Space discharge detector circuit I have disclosed a device for demodulating high frequency currents making use of a two-element space discharge tube.

In my copending application, Serial No. 571,500, filed October 28, 1931, for Detector circuit for three-element space discharge tube I have shown a device having three electrodes enclosed within the envelope of the tube and providing suitable means for effecting demodulation.

The present invention distinguishes from those of the copending applications just mentioned in that while a third electrode is provided it is not an integral part of the tube itself. A number of advantages result from the employment of a tube having only two electrodes, the tube being disposed in such a manner as to be supplied with an external control electrode which is integral with the tube mounting. I have discovered that in operating a space discharge tube a control of the currents within the tube may be obtained by simply surrounding the envelope of the tube with a suitable conductor upon which may be impressed the variable potential of the input circuit.

One application of the present invention is in the operation of a detector circuit as shown in Fig. 7. Another use of this invention will readily be understood upon reference to my copending application, Serial No. 572,551, filed November 2, 1931, entitled Modulation system. In that application a space discharge tube having two internal electrodes and one external electrode is shown as a preferable device for use in a modulator network.

Referring to the drawing in detail, the space discharge tube 1 or 1a as shown in Figs. 1 and 2, respectively, comprises an envelope within which two electrodes 2 and 3 are suitably sealed. The ends of these electrodes are preferably made spatulate and disposed with the thin edge of one presented to the face of the other for the purpose of reducing to a minimum the interelectrode capacity. This construction, however, I have previously disclosed in my Patent No. 1,888,556, dated November 22, 1932. The tube may be cylindrically formed as shown in Fig. 1, or, if desired, it may be formed somewhat in the shape of a dumb-bell as shown in Fig. 2. The enlarged ends and the constricted center portion render the tube more suitable for some of its uses. The external tip 4 for each of the internal electrodes is preferably surrounded with a soft metal such as solder so that a good contact can be made with the clips of the mounting hereinafter described.

Within the envelope of the tube 1 is an attenuated atmosphere of any suitable gas. In the manufacture of the tube the air is first exhausted through the tip 30 and when an inert gas has been introduced at suitable pressure this tip is hermetically sealed. In operation the electrodes 2 and 3 of the tube are connected with an external circuit including a source of energy 14, and a protective resistance 13 whereby direct current of suitable value is supplied to excite the tube and to surround the active portion of the cathode with a glow discharge.

Either the tube 1 or the tube 1a may readily be inserted in a mounting of the type shown in Figs. 3, 4 and 5. This mounting is preferably of molded insulating material such as bakelite. The terminals 6, 7 and 8 are attached by means of screws 9. Screw-holes 10 are provided for ease in affixing the mounting in any suitable position on a base or instrument panel.

It will be understood that in the employment of space discharge tubes of the type herein shown, it is customary to impress a dangerously high voltage upon the circuit traversing the anode 2 and the cathode 3, for which reason I preferably surround one of the terminal clips 6 with a hooded portion 11 of the molded insulating material of my mounting. Thus even if the source of potential is not disconnected from the terminal clips there would be only the remotest chance for any one to receive a shock while handling the tube for the purpose of inserting or removing the same from the mounting. The terminal clips 6 and 7 are provided with indentations 12 forming suitable seats for the metallic tips 4 of the tube. Furthermore, these clips are made of resilient material so that they will offer compression to the tube longitudinally of its axis.

Fig. 6 shows a modification of the tube mounting which may be used where it is preferable to connect the control electrode to the tube other than through the base. The tube itself may be held in position by spring clips 31 having slots therein through which the external tips of the internal electrodes may be inserted. A second spring clip 32 is positioned adjacent each clip 31 and adapted to press upon the end of the tip so as to make a good contact therewith. The control electrode may be in the form of a clip 33 connected to the end of a flexible lead, this clip being of well-known construction and suitable for clamping to the constricted center portion of the tube. Connections with the anode and cathode of the tube may be made through the screws 34 by which the clips 31 and 32 are fixed to the base 35.

Referring now to Fig. 7, it will be seen that the space discharge tube and mounting of my invention may be utilized in a detector circuit such as that shown in the diagram. In some respects this detector circuit is similar to that disclosed in my copending application, Serial No. 571,500, filed October 28, 1931. In the form herein shown, however, the space discharge tube 1 is mounted between the contact clips 6 and 7 with the third clip 8 surrounding the central portion of the tube. Contact clip 6 connects the anode 2 of the tube through a high resistance 13 to the source of direct current 14. The negative side of this source is connected with one side of a coil 15 constituting the primary of an audio frequency transformer 16. The other terminal of the primary 15 is connected to the contact clip 7 which supplies negative potential to the cathode 3 of the tube. The input circuit of this tube includes an inductance 17 in parallel with a variable condenser 18, both the inductance and the condenser being connected on the one side to the control electrode 8 and on the other side to the movable member 19 of a single pole double throw switch. By means of this switch the input circuit may be returned to the tube either through the cathode 3 as when the movable member 19 is in contact with the terminal 20; or, the input circuit may be led back to the anode 2 when the switch member 19 is in contact with the switch terminal 21. Variations in the operating conditions seem to require sometimes an anode connection and sometimes a cathode connection for optimum results. The inductance 17 comprises a secondary coil of a high frequency transformer, the primary 22 of which is included in the antenna circuit having an antenna 23, ground 24, and preferably a small condenser 25. By tuning the 17—18 branch to resonance of the carrier frequency of the received signaling energy the modulated high frequency currents transferred to the input circuit from the antenna circuit are caused to vary the charge upon the control electrode 8 with respect to the other electrode of the tube which is included in the input circuit. The effect on the output circuit is such that demodulation of the high frequency current occurs.

In order that the audio frequency currents may be suitably conducted through the primary 15 of the transformer 16 they are shunted around the high resistance 13 and battery 14 by means of a condenser 26 which is preferably of a large value so as to offer a low impedance to audio frequency currents. A small condenser 27 may be used to advantage across the primary 15 for by-passing high frequency currents. The secondary 28 of the transformer 16 is in circuit with any desired responsive device such as the phones 29. Obviously, in place of the phone, a loud speaker or other receiving device may be used if preferred or amplification may be introduced between the detector circuit and the loud speaker.

In the operation of the detector circuit, according to Fig. 7, it will be understood that the high frequency signaling energy absorbed in the antenna circuit is transferred to the input circuit of the tube 1. Demodulation takes place on account of the operating characteristics of this tube. Demodulated audio frequency currents are impressed upon the output circuit which includes the primary 15 of the audio frequency transformer 16. Audio frequency signals are therefore induced in the secondary 28 of this transformer and conducted to the responsive device 29.

It will be evident from the foregoing that the space discharge tube and mounting therefor as shown in combination in this application may have other uses than that which is shown in Fig. 7.

Although I have shown two preferred embodiments of my space discharge tube and mounting, either of which may be used in a detector network or otherwise in connection with high frequency signaling, it will be understood that many changes may be made therein without departing from the spirit and intended scope of my invention. I do not, therefore, limit myself to the foregoing except insofar as may be determined by the scope of the appended claims.

I claim:

1. A space discharge device and mounting therefor comprising a two-electrode gaseous discharge tube, a pair of terminal clips engageable with the electrode terminals of said tube, means comprising a metallic member supported by said mounting in position to serve as an external control electrode for said tube and means comprising a hooded portion of said mounting for protectively shielding one of said electrode terminals from accidental personal contact.

2. A space discharge device and mounting therefor comprising a dumb-bell-shaped envelope, electrodes within the envelope each having an external contact tip, a plurality of resilient metallic supports for said tube each engageable therewith and adapted to supply energy thereto for actuating the same, two of said supports making contact respectively with said electrode tips and a third of said supports adapted to at least partially surround the restricted central portion of said tube whereby it is in position to produce an electric field to influence the ionization discharge within said tube.

3. A space discharge device and mounting therefor comprising a two-element ionization discharge tube, a single mounting means provided with a pair of resilient metallic supporting contact clips for supplying currents internally of said tube across the elements thereof and means including a metallic terminal clip upon which may be impressed a variable potential of modulated signaling energy, said terminal clip being adapted to partially surround the envelope of said tube whereby it serves as the sole control electrode thereof for said discharge device.

4. A space discharge device comprising, a tube enveloping two electrodes and a gas at an attenuated pressure, a unitary mounting for said tube having resilient metallic contact terminals adapted to support said tube and to make contact with the external portions of the electrodes of said tube and a third contact terminal substantially surrounding the central portion of said tube to function as the control electrode of said discharge device.

AUGUST HUND.